United States Patent
Kakuda et al.

(10) Patent No.: US 11,326,079 B2
(45) Date of Patent: May 10, 2022

(54) AQUEOUS BONDING COMPOSITION

(71) Applicant: HENKEL AG & CO. KGAA, Duesseldorf (DE)

(72) Inventors: Atsushi Kakuda, Osaka (JP); Yoshio Yoshida, Osaka (JP)

(73) Assignee: Henkel AG & CO. KGaA, Dusseldorf (DE)

( * ) Notice: Subject to any disclaimer, the term of this patent is extended or adjusted under 35 U.S.C. 154(b) by 0 days.

(21) Appl. No.: 15/883,239

(22) Filed: Jan. 30, 2018

(65) Prior Publication Data

US 2018/0155584 A1 Jun. 7, 2018

Related U.S. Application Data

(63) Continuation of application No. PCT/JP2016/003545, filed on Aug. 2, 2016.

(51) Int. Cl.

| | |
|---|---|
| *C09J 105/00* | (2006.01) |
| *C09D 105/00* | (2006.01) |
| *C08L 97/02* | (2006.01) |
| *B32B 21/04* | (2006.01) |
| *C08K 3/28* | (2006.01) |
| *C08K 3/32* | (2006.01) |
| *C08K 5/17* | (2006.01) |
| *B27N 3/00* | (2006.01) |
| *B27N 7/00* | (2006.01) |

(52) U.S. Cl.
CPC ............. *C09J 105/00* (2013.01); *B32B 21/04* (2013.01); *C08K 3/28* (2013.01); *C08K 3/32* (2013.01); *C08K 5/17* (2013.01); *C08L 97/02* (2013.01); *C09D 105/00* (2013.01); *B27N 3/002* (2013.01); *B27N 7/005* (2013.01); *C08K 2003/321* (2013.01); *C09J 2203/00* (2013.01)

(58) Field of Classification Search
None
See application file for complete search history.

(56) References Cited

U.S. PATENT DOCUMENTS

| | | | |
|---|---|---|---|
| 4,183,997 A | 1/1980 | Stofko | |
| 4,382,884 A | 5/1983 | Rohringer et al. | |
| 6,982,049 B1 | 1/2006 | Mabey et al. | |
| 9,718,729 B2 * | 8/2017 | Hernandez-Torres | ...................... A01N 25/04 |
| 2007/0027283 A1 | 2/2007 | Swift et al. | |
| 2011/0300380 A1 * | 12/2011 | Brady | ................... C08K 5/151 428/375 |

FOREIGN PATENT DOCUMENTS

| | | | |
|---|---|---|---|
| GB | 2451719 | * | 4/2008 |
| GB | 2451719 A | | 2/2009 |
| JP | 56-500414 A | | 12/1981 |
| JP | 2009-503193 A | | 1/2009 |
| JP | WO2015072437 | * | 5/2015 |
| RU | 2280661 C1 | | 7/2006 |
| WO | 2009010393 A1 | | 1/2009 |
| WO | WO2009/010393 | * | 1/2009 |
| WO | 2010001988 A1 | | 1/2010 |
| WO | 2012133219 A1 | | 10/2012 |
| WO | 2015072437 A1 | | 5/2015 |

OTHER PUBLICATIONS

WO2015072437 Translation (Year: 2015).*
Wulphson N.S. Preparative organic chemistry, GXI, M., 1959 (p. 408, table 21).
Azimov A., The Word of Carbon, "Chemistry", M., 1978 (p. 78).
Petrov A.A. et al. Organic chemistry, "Higher school", 1981 (p. 545).
International Search Report PCT/JP2016/003545 Completed: Oct. 17, 2016; dated Oct. 26, 2016 4 Pages.

* cited by examiner

*Primary Examiner* — Colin W. Slifka

(74) *Attorney, Agent, or Firm* — Sun Hee Lehmann; Steven C. Bauman

(57) ABSTRACT

Disclosed is an aqueous bonding composition comprising: (A) a saccharide; (B) a phosphate; and (C) at least one neutralizing agent selected from ammonia and an amine compound having at least one hydroxyl group. The aqueous bonding composition is excellent in balance among bending strength, bending strength under wet condition, water-absorption thickness expansion coefficient and peeling strength and scarcely causes metal to rust. The aqueous bonding composition can be usefully used to produce a wood-based material.

4 Claims, No Drawings

AQUEOUS BONDING COMPOSITION

CROSS-REFERENCE TO RELATED APPLICATIONS

This application is a continuation of International Patent Application No. PCT/JP2016/003545 filed Aug. 2, 2016, which claims the benefit of Japanese Patent Application No. 2015-154777 filed on Aug. 5, 2015, the contents of both of which are incorporated by reference.

TECHNICAL FIELD OF THE INVENTION

The present invention relates to an aqueous bonding composition capable of producing an aqueous adhesive, and a wood-based material which is producible by using the aqueous bonding composition.

BACKGROUND OF THE INVENTION

Wood-based materials (for example, plywoods (veneer board, etc.), particle boards, fiber boards (medium density fiber board MDF, etc.), and laminated woods) are generally produced by applying or spraying an adhesive onto a wood-based element (a raw material) (for example, various sizes of fibers, small pieces, and veneers obtained by finely dividing woods or herbaceous plants), followed by molding with optional pressurizing and heating. Wood-based materials are naturally regenerable and are materials in which size and stability of strength are enhanced and thus defects peculiar to woods are removed while utilizing advantages of woods. From the viewpoint of the protection of the earth environment, and the protection of workers of the production of wood-based materials, an aqueous adhesive as the adhesive to be used, which does not cause diffusion of formaldehyde and contains no organic solvent, has been developed.

When a wood-based material (for example, particle board) is produced using a urea resin and a phenol resin, a mixture of a wood-based element and an adhesive is generally heated to a temperature in a range of about 130 to 170° C. and then molded. Therefore, it is preferable that the aqueous adhesive is also heated to approximately the same temperature, thus making it possible to produce the wood-based material. However, when using the aqueous adhesive, higher temperature is often needed.

There is also a need that the wood-based material thus obtained (for example, particle board) is excellent in properties such as bending strength, bending strength under wet condition, water-absorption thickness expansion coefficient, and peeling strength. However, when using the aqueous adhesive, properties are often unsatisfactory.

JP 56-500414 A discloses an aqueous solution comprising a starch (wheat flour, etc.) and a saccharide (sucrose, molasses, etc.), and a catalyst (ammonium chloride, zinc chloride, aluminum chloride, ammonium sulfate, ammonium nitrate, diammonium phosphate, etc.) capable of converting them, so as to joint woods (see Examples of JP 56-500414 A).

JP 56-500414 A teaches anhydrous aluminum chloride as a catalyst capable of lowering a heating temperature. The patent document discloses that a particle mat can be obtained at a press temperature of 175° C. to 190° C. when using aluminum chloride, and that thickness expansion is in a range of about 3 to 10% (see Tables 1 and 2 of Examples of JP 56-500414 A). However, aluminum chloride is not suitable since it has corrosiveness to human bodies and vigorously reacts with water to generate hydrogen chloride, leading to emission of irritant odor.

WO 2010/001988 A1 discloses an adhesive including a saccharide (sucrose, etc.) and a polycarboxylic acid (citric acid, etc.), so as to joint woods. Inclusion of the polycarboxylic acid leads to an improvement in bonding power with woods. However, the temperature in the case of producing a wood-based material is as high as 200° C. Furthermore, a water-absorption thickness expansion coefficient is as large as about 25% (see Test 2 in Table 10 of WO 2010/001988 A1). The pH decreases because of including the polycarboxylic acid, so that it becomes difficult to store the adhesive. Furthermore, in the case of applying the adhesive using an applicator, metal components of the applicator easily rust.

WO 2012/133219 A1 discloses an adhesive including a saccharide (sucrose, maltose, etc.) and a polycarboxylic acid (citric acid, malic acid, maleic anhydride, polymaleic acid, polyacrylic acid, etc.), so as to joint woods. Inclusion of the polycarboxylic acid leads to an improvement in joint power with woods. However, the temperature in the case of producing a wood-based material by molding is as high as 180 to 200° C. The addition of a furan compound enables a decrease in manufacturing temperature and also a decrease in water-absorption thickness expansion coefficient (see Tables 2 to 7 of WO 2012/133219 A1). However, the pH decreases because of including the polycarboxylic acid, so that it becomes difficult to store the adhesive, and metal components of an adhesive applicator easily rust.

Therefore, it is required that an aqueous adhesive used to produce a wood-based material is excellent in performances such as water-absorption thickness expansion coefficient while being capable of bonding at a comparatively low temperature, and is also easily stored and does not cause metal components of an applicator to rust.

[PTL 1] JP 56-500414 A
[PTL 2] WO 2010/001988 A1
[PTL 3] WO 2012/133219 A1

SUMMARY OF THE INVENTION

In light of these circumstances, the present invention has been made and an object thereof is to provide an aqueous bonding composition which is excellent in water-absorption thickness expansion coefficient while being capable of bonding at a comparatively low temperature, and which scarcely causes metal to rust and is particularly useful to produce a wood-based material; and to produce a wood-based material which is obtainable by using the aqueous bonding composition.

As a result of continued intensive study, the present inventors have found that an aqueous bonding composition comprising a saccharide, a phosphate, and a specific neutralizing agent selected from an amine compound having a hydroxyl group and ammonia is excellent in water-absorption thickness expansion coefficient while being capable of bonding at a comparatively low temperature, and which scarcely causes metal to rust and is particularly useful to produce a wood-based material, thus completing the present invention.

The present invention provides, in an aspect, an aqueous bonding composition comprising: (A) a saccharide; (B) a phosphate; and (C) at least one neutralizing agent selected from ammonia and an amine compound having at least one hydroxyl group.

The present invention provides, in an embodiment, an aqueous bonding composition, wherein the neutralizing agent (C) has a boiling point of 300° C. or lower.

The present invention provides, in another embodiment, an aqueous bonding composition, which has a pH in a range of 6.5 to 10.0.

The present invention provides, in a further embodiment, an aqueous bonding composition, wherein the saccharide (A) comprises a non-reducing saccharide.

The present invention provides, in another aspect, a wood-based material which is obtainable by using the aqueous bonding composition.

The aqueous bonding composition according to the embodiment of the present invention comprises (A) a saccharide, (B) a phosphate, and (C) at least one neutralizing agent selected from ammonia and an amine compound having at least one hydroxyl group, and is therefore excellent in water-absorption thickness expansion coefficient while being capable of bonding at a comparatively low temperature, and scarcely causes metal to rust and is particularly useful to produce a wood-based material.

The aqueous bonding composition according to the embodiment of the present invention comprises (A) a saccharide, (B) a phosphate, and (C) at least one neutralizing agent selected from ammonia and an amine compound having at least one hydroxyl group.

In the present invention, the "(A) saccharide" is generally called a saccharide and is not particularly limited as long as the objective aqueous bonding composition of the present invention is obtainable. The saccharide (A) includes, for example, monosaccharide, disaccharide, trisaccharide, tetrasaccharide, polysaccharide, and other oligosaccharides.

Specific examples of the "monosaccharide" include the followings:

hexoses such as glucose, psicose, fructose, sorbose, tagatose, allose, altrose, mannose, gulose, idose, galactose, talose, fucose, fuculose, and rhamnose;

trioses such as ketotriose (dihydroxyacetone) and aldotriose (glyceraldehyde);

tetroses such as erythrulose, erythrose, and threose; and pentoses such as ribulose, xylulose, ribose, arabinose, xylose, lixose, and deoxyribose.

Examples of the "disaccharide" include sucrose, lactose, maltose, trehalose, turanose, and cellobiose.

Examples of the "trisaccharide" include raffinose, melezitose, and maltotriose.

Examples of the "tetrasaccharide" include acarbose and stachyose.

Examples of the "polysaccharide" include glycogen, starch (amylose, amylopectin, etc.), cellulose, dextrin, glucan, N-acetylglucosamine, chitin, and inulin.

Examples of the "other oligosaccharides" include fructooligosaccharide, galactooligosaccharide, and mannan oligosaccharide.

These "saccharide(s)" can be used alone or in combination.

The "saccharide" preferably includes a non-reducing saccharide. When the "saccharide" includes the non-reducing saccharide, the aqueous bonding composition of the present invention is more excellent in water resistance, so that the water-absorption thickness expansion coefficient of the wood-based material of the present invention can further decrease.

Examples of the non-reducing saccharide include sucrose, trehalose, maltotriose, inulin, oligosaccharide, and dextrin. When the non-reducing saccharide includes sucrose, the water-absorption thickness expansion coefficient of the wood-based material can further decrease. Inulin usually refers to a polymer of fructose, including glucose linked to the end. Therefore, inulin includes, for example, 1-kestose (GF2) included in simplest trisaccharide, nystose (GF3) included in tetrasaccharide, fructofuranosylnystose (GF4) included in polysaccharide, and the like.

It is possible to use commercially available products as the "saccharide".

In the present invention, the "(B) phosphate" is generally called a phosphate and is not particularly limited as long as the objective aqueous bonding composition of the present invention is obtainable.

Examples of the "phosphate" include a hydrogen phosphate and a dihydrogen phosphate.

Examples of the "phosphate" include phosphonic acid ammonium salts (ammonium phosphate, ammonium hydrogen phosphate, and ammonium dihydrogen phosphate), phosphonic acid sodium salts (sodium phosphate, sodium hydrogen phosphate, and sodium dihydrogen phosphate), phosphonic acid potassium salts (potassium phosphate, potassium hydrogen phosphate, and potassium dihydrogen phosphate), phosphonic acid calcium salts (calcium phosphate, calcium hydrogen phosphate, and calcium dihydrogen phosphate), phosphonic acid magnesium salts (magnesium phosphate, magnesium hydrogen phosphate, and magnesium dihydrogen phosphate), and the like.

The "phosphate" is preferably at least one selected from ammonium phosphates (ammonium phosphate, ammonium hydrogen phosphate, and ammonium dihydrogen phosphate).

When the "(B) phosphate" is at least one selected from ammonium phosphates (ammonium phosphate, ammonium hydrogen phosphate, and ammonium dihydrogen phosphate), the aqueous bonding composition of the present invention is excellent in curability.

The "(B) phosphate(s)" can be used alone or in combination.

It is possible to use commercially available products as the "(B) phosphate".

In the present invention, the "(C) neutralizing agent" includes at least one selected from ammonia and an amine compound having at least one hydroxyl group.

The "amine compound having at least one hydroxyl group" refers to an amine compound having one or more hydroxyl groups and is not particularly limited as long as the objective aqueous bonding composition of the present invention is obtainable.

The "ammonia" generally refers to a compound which is generally called ammonia, and may be in the form of an aqueous solution prepared by being dissolved in water (usually called ammonia water), and is not particularly limited as long as the objective aqueous bonding composition of the present invention is obtainable.

Examples of the "(C) neutralizing agent" include ammonia, 2-amino-2-methylpropanol, diethanolamine, N,N-dimethylaminoethanol, and triethanolamine, and is more preferably:

at least one selected from ammonia, 2-amino-2-methylpropanol, diethanolamine, and N,N-dimethylaminoethanol.

When the neutralizing agent (C) is at least one selected from ammonia, 2-amino-2-methylpropanol, diethanolamine, and N,N-dimethylaminoethanol, the water-absorption thickness expansion coefficient of the wood-based material can decrease.

The neutralizing agent (C) preferably has a boiling point of 300° C. or lower, and more preferably in a range of −40° C. to 280° C. If the neutralizing agent has a boiling point of 300° C. or lower, when using the aqueous bonding composition of the present invention, metal components of an adhesive applicator more scarcely rust, and thus the water-absorption thickness expansion coefficient of the wood-based material can further decrease.

The neutralizing agent(s) (C) can be used alone or in combination.

It is possible to use commercially available products as the neutralizing agent (C).

The component (A) is preferably included in an amount of 20 to 95 parts by weight, more preferably 50 to 90 parts by weight, and particularly preferably 60 to 85 parts by weight, based on 100 parts by weight of the total amount of the components (A) to (C).

The component (B) is preferably included in an amount of 1 to 50 parts by weight, more preferably 3 to 35 parts by weight, and particularly preferably 5 to 25 parts by weight, based on 100 parts by weight of the total amount of the components (A) to (C).

The component (C) is preferably included in an amount of 0.5 to 50 parts by weight, more preferably 1 to 35 parts by weight, and particularly preferably 2 to 25 parts by weight, based on 100 parts by weight of the total amount of the components (A) to (C).

If the component (A) is included in an amount of 20 to 95 parts by weight, the water-absorption thickness expansion coefficient of the wood-based material of the present invention can further decrease.

If the component (B) is included in an amount of 1 to 50 parts by weight, the aqueous bonding composition of the present invention can have more excellent curability.

If the component (C) is included in an amount of 0.5 to 50 parts by weight, when using the aqueous bonding composition of the present invention, metal components of an adhesive applicator may more scarcely rust, and thus the water-absorption thickness expansion coefficient of the wood-based material can further decrease.

The aqueous bonding composition according to the present invention includes water, and has a form of an aqueous solution in which all of the above-mentioned components (A) to (C) are dissolved in water, or a form of a dispersion in which at least one of the above-mentioned components (A) to (C) is dispersed without being dissolved in water.

The "water" as used herein is generally called "water" and is not particularly limited as long as the objective aqueous bonding composition of the present invention is obtainable. Examples thereof can include distilled water, deionized water, pure water, tap water, and industrial water.

The amount of water contained in the aqueous bonding composition according to the embodiment of the present invention is not particularly limited as long as the objective aqueous bonding composition of the present invention is obtainable, and is appropriately selected considering the components (A) to (C) to be used and additives.

The aqueous bonding composition according to the embodiments of the present invention preferably includes water in an amount of 10 to 90 parts by weight, more preferably 20 to 80 parts by weight, and particularly preferably 30 to 60 parts by weight, based on 100 parts by weight of the total amount of the components (A) to (C).

The aqueous bonding composition according to the present invention is in a form of an aqueous solution or a water dispersion, so that it is easy to apply or spray onto an adherend. Furthermore, the aqueous bonding composition according to the present invention is excellent in protection of the earth environment, and protection of the work environment of workers because an organic solvent is not preferably used.

The aqueous bonding composition according to the embodiments of the present invention can include other components. Examples of the component can include a thickener, a preservative, a mildew-proofing agent, a rust preventive, a dispersion stabilizer and so on.

The thickener is used to prevent a viscosity of the composition from decreasing in the case of pressurizing and heating, and is not particularly limited as long as the objective aqueous bonding composition of the present invention is obtainable. The thickener is classified, for example, into an organic thickener and an inorganic thickener.

Examples of the inorganic thickener can include clay, talc, silica and so on.

Examples of the organic thickener can include carboxymethyl cellulose, polyvinyl alcohol, and vegetable flours such as wheat flour, cornstarch, top-grade rice flour, walnut flour, coconut flour, and so on.

These thickeners can be used alone or in combination.

The pH of the aqueous bonding composition according to an embodiment of the present invention is preferably in a range of 6.5 to 10.0, more preferably 7.5 to 9.5, and particularly preferably 7.0 to 9.0.

The pH of the aqueous bonding composition is more preferably in a range of 6.5 to 10.0, since the composition can be stored easier and scarcely cause metal components of an applicator to rust.

The aqueous bonding composition according to the embodiment of the present invention can be produced by mixing the above-mentioned components (A) to (C), optional other components and water, followed by stirring. The order of mixing, the mixing method, and the stirring method are not particularly limited as long as the objective aqueous bonding composition of the present invention is obtainable.

The wood-based material according to the present invention is produced by applying or spraying the aqueous bonding composition according to the embodiments of the present invention onto a wood-based element (raw material) (for example, small pieces, veneers, fibers of wood-based or herbaceous plants, etc.), heating and pressurizing the wood-based element to cure the aqueous bonding composition, leading to bonding of the wood-based element, followed by molding.

Examples of the wood-based element (raw material) include, for example, sawn boards, veneers, wood-based strands, wood-based chips, wood-based fibers and vegetable fibers, and the like obtainable, for example, by grinding woods etc. These wood-based elements can be used alone or in combination.

Examples of the wood-based material include, for example, laminated woods, plywoods, particle boards, fiber boards, MDF, and the like obtainable, for example, by bonding the wood-based element using an adhesive.

The aqueous bonding composition according to the embodiments of the present invention can be used to bond various adherends (for example, papers, wood-based fibers, plywoods, etc.), and can be suitably used to produce the wood-based material.

In the case of producing the wood-based material by molding, manufacturing condition such as coating amount of the aqueous bonding composition, coating method, molding pressure, molding temperature, and molding time are appropriately selected according to the type, shape and size of the wood-based element, and the size of the wood-based material to be produced, and are not particularly limited as long as the objective wood-based material of the present invention is obtainable.

The coating amount of the aqueous bonding composition is preferably in a range of 5 to 80 parts by weight, more preferably 10 to 60 parts by weight, and particularly preferably 20 to 40 parts by weight, based on 100 parts by weight of a dried wood-based element.

The coating method of the aqueous bonding composition is preferably a coating method using a roll and a brush, a spraying method using a spray, a method of impregnating with the aqueous bonding composition, or the like.

The molding pressure is preferably in a range of 0.5 to 6.0 MPa. If the molding pressure is 6.0 MPa or less, the wood-based material is scarcely degraded since too large pressure is not applied. If the molding pressure is 0.5 MPa or more, it is possible to satisfactorily bond the wood-based element.

The molding temperature is preferably in a range of 150 to 230° C., more preferably 155 to 200° C., and particularly preferably 160 to 180° C. If the molding temperature is 230° C. or lower, the temperature is not too high, energy consumption is low, and also the wood-based material is scarcely degraded. If the molding is carried out at a temperature of 150° C. or higher, the bonding can proceed within an appropriate time.

The molding time is preferably in a range of 5 to 10 minutes, more preferably 6 to 9 minutes, and particularly preferably 7 to 8 minute. If the molding time is 10 minutes or less, low energy consumption is achieved because of non-excessive time, and also the wood-based material is scarcely degraded. If the molding time is 5 minutes or more, an appropriate bonding time is secured, thus making it possible to secure appropriate bonding.

The wood-based material thus obtained in the above-mentioned manner can be used for various applications, for example, building materials and furniture etc., like conventional wood-based materials.

EXAMPLES

The present invention will be described below by way of Examples and Comparative Examples. It should be noted, however, these Examples are intended to describe the present invention and the present invention is not limited thereto.

First, the following components were prepared as components of an aqueous bonding composition. Trade name and manufacturer's name are shown in parentheses. Parts are by weight.

<(A) Saccharide>
(A-1) Sucrose (Wako Pure Chemical Industries, Ltd.)
<(B) Inorganic Acid Ammonium Salt>
(B-1) Ammonium Dihydrogen Phosphate (Wako Pure Chemical Industries, Ltd.)
<(C) Neutralizing Agent>
(C-1) Ammonia (25% Ammonia Water, Wako Pure Chemical Industries, Ltd.)
(C-2) 2-Amino-2-Methylpropanol (Wako Pure Chemical Industries, Ltd.)
(C-3) Diethanolamine (Wako Pure Chemical Industries, Ltd.)
(C-4) Triethanolamine (Wako Pure Chemical Industries, Ltd.)
(C'-5) Sodium Hydroxide (Wako Pure Chemical Industries, Ltd.)

An aqueous bonding composition of Example 1 was produced in the following manner.

Example 1: Production of Aqueous Bonding Composition 78.0 Parts of (A-1) sucrose (Wako Pure Chemical Industries, Ltd.) and 19.5 parts of (B-1) ammonium dihydrogen phosphate (Wako Pure Chemical Industries, Ltd.) were dissolved in 92.5 parts of distilled water. To this aqueous solution, 2.5 parts of (C-1) ammonia (containing 2.5 parts of ammonia and 7.5 parts of water because of using 10.0 parts of 25% ammonia water, Wako Pure Chemical Industries, Ltd.) was added. After stirring at normal temperature, an aqueous bonding composition of Example 1 was obtained. The composition of the aqueous bonding composition of Example 1 is shown in Table 1.

<Measurement of pH>

The pH of the aqueous composition of Example 1 was measured at 23° C. using a pH meter (Model HM-25R (trade name) manufactured by DKK-TOA CORPORATION). As a result, the pH was 7.0. The results are shown in Table 1.

<Rust Test>

The aqueous bonding composition (40 g) of Example 1 was charged in a 100 mL glass container with a lid. A commercially available iron nail having a length of 70 mm degreased with isopropanol was put in the aqueous adhesive composition. After being left to stand at 23° C. for 7 days, generation of rust was observed.

A: Rust was not generated for 7 days.
B: Rust was generated within 3 to 7 days.
C: Rust was generated within 1 to 3 days.
D: Rust was generated within 1 day.

Examples 2 to 6 and Comparative Examples 7 to 10: Production of Aqueous Bonding Compositions The composition of each of aqueous bonding compositions of Examples 2 to 6 and Comparative Examples 7 to 10 is shown in Tables 1 to 2.

In the same manner as in Example 1, except that the components (A), (B), and (C) used in Example 1 were changed to components shown in Tables 1 to 2 and amounts thereof, the aqueous bonding compositions of Examples 2 to 6 and Comparative Examples 7 to 10 were produced.

In the same manner as in Example 1, the pH was measured and also the rust test was performed. The results are shown in Tables 1 to 2.

TABLE 1

| | | (Examples) | | | | | |
|---|---|---|---|---|---|---|---|
| Composition | | 1 | 2 | 3 | 4 | 5 | 6 |
| (A) | (A-1) | 78.0 | 77.4 | 75.5 | 68.6 | 66.6 | 60.9 |
| (B) | (B-1) | 19.5 | 19.3 | 18.9 | 17.2 | 16.7 | 15.2 |
| (C) | (C-1) | 2.5 | 3.3 | 5.6 | | | |
| | (C-2) | | | | 13.9 | | |
| | (C-3) | | | | | 16.7 | |
| | (C-4) | | | | | | 23.8 |
| | (C'-5) | | | | | | |
| | Water | 100 | 100 | 100 | 100 | 100 | 100 |
| | pH | 7.0 | 9.0 | 9.9 | 8.3 | 8.4 | 8.1 |
| | Rust test | B | A | A | A | A | A |

TABLE 2

| | | (Comparative Example) | | | |
|---|---|---|---|---|---|
| Composition | | 7 | 8 | 9 | 10 |
| (A) | (A-1) | 74.3 | 100 | | 80.0 |
| (B) | (B-1) | 18.6 | | 100 | 20.0 |
| (C) | (C-1) | | | | |
| | (C-2) | | | | |
| | (C-3) | | | | |
| | (C-4) | | | | |
| | (C'-5) | 7.1 | | | |

TABLE 2-continued

|  | (Comparative Example) | | | |
|---|---|---|---|---|
| Composition | 7 | 8 | 9 | 10 |
| Water | 100 | 100 | 500 | 100 |
| pH | 8.5 | 6.8 | 3.3 | 3.3 |
| Rust test | A | B | D | D |

Using the above-mentioned aqueous bonding compositions of Examples 1 to 6 and Comparative Examples 7 to 10, wood-based materials (particle boards) of Examples 11 to 16 and Comparative Examples 17 to 20 were produced.

Example 11: Production of Wood-Based Material

Wood-based fibers of coniferous tree, which passed through a 60 mesh sieve, were used as a wood-based element (raw material). The aqueous adhesive composition of Example 1 was uniformly applied onto 76 parts of the wood-based element using a spray so that the solid content became 24 parts. The coated wood-based element was dried in an oven at 80° C. for 2 hours. After press molding at a heating platen temperature of 170° C. under a pressure of 4 MPa for 9 minutes, a wood-based material (particle board) having a thickness of 9 mm and a density of 0.8 g/cm$^3$ of Example 11 was produced. The raw materials and manufacturing conditions of the wood-based material of Example 11 are shown in Table 3.

Examples 12 to 16 and Comparative Examples 17 to 20: Production of Wood-Based Materials Raw materials used to produce particle boards of Examples 12 to 16 and Comparative Examples 17 to 20, amounts thereof, and press molding conditions are shown in Tables 3 to 4.

In the same manner as in Example 11, except that the aqueous adhesive composition used in Example 11, the amount thereof, the amount of the wood-based element, and the press molding conditions (heating platen temperature, pressure, and molding time) were changed to the values shown in Tables 3 to 4, wood-based materials (particle boards) of Examples 12 to 16 and Comparative Examples 17 to 20 were produced. Other conditions such as size and density of each particle board are the same as those of the particle board of Example 11.

Regarding the particle board thus obtained, each water-absorption thickness expansion coefficient (%) was measured in accordance with JISA5908:2003.

The "water-absorption thickness expansion coefficient (%)" is preferably 12 or less.

The above-mentioned particle board corresponds to a "non-polished board" of a "base particle board" disclosed in JISA5908:2003.

TABLE 3

|  |  |  | (Example) | | | | | |
|---|---|---|---|---|---|---|---|---|
| Wood-based material |  |  | 11 | 12 | 13 | 14 | 15 | 16 |
| Composition | Wood-based element | Parts by weight | 76 | 76 | 76 | 76 | 76 | 76 |
|  | Bonding composition | (Example) | 1 | 2 | 3 | 4 | 5 | 6 |
|  |  | Parts by weight | 24 | 24 | 24 | 24 | 24 | 24 |
| Molding conditions | Temperature | ° C. | 170 | 170 | 170 | 170 | 170 | 170 |
|  | Time | Minutes | 9 | 9 | 9 | 9 | 9 | 9 |
|  | Pressure | MPa | 4 | 4 | 4 | 4 | 4 | 4 |
| Performances | Water-absorption thickness expansion coefficient (%) |  | 12.0 | 11.3 | 11.2 | 11.9 | 10.5 | 14.8 |

TABLE 4

|  |  |  | (Comparative Example) | | | |
|---|---|---|---|---|---|---|
| Wood-based material |  |  | 17 | 18 | 19 | 20 |
| Composition | Wood-based element | Parts by weight | 76 | 72 | 94 | 80 |
|  | Bonding composition | (Comparative Example) | 7 | 8 | 9 | 10 |
|  |  | Parts by weight | 24 | 28 | 6 | 20 |
| Molding conditions | Temperature | ° C. | 170 | 170 | 170 | 170 |
|  | Time | Minutes | 9 | 9 | 9 | 9 |
|  | Pressure | MPa | 4 | 4 | 4 | 4 |
| Performances | Water-absorption thickness expansion coefficient (%) |  | Collapse | Collapse | Collapse | 20.4 |

*Collapse: The wood-based material was broken so that it became difficult to maintain the whole form during the evaluation.

As shown in Tables 3 and 4, each of the wood-based materials of Examples 11 to 16, produced using the aqueous bonding compositions of Examples 1 to 6, has a small water-absorption thickness expansion coefficient. Furthermore, each of the aqueous bonding compositions of Example 1 to 6 can prevent the nail from rusting. Therefore, the bonding compositions according to the present invention can be suitably used (or applied) to a wood-based element so as to produce a wood-based material.

As shown in Table 4, the wood-based materials of Comparative Examples 17 to 20 produced by using the aqueous bonding compositions of Comparative Examples 7 to 10 are inferior in water-absorption thickness expansion coefficient. Furthermore, the aqueous bonding compositions of Comparative Examples 9 and 10 cannot prevent the nail from rusting because of the low pH.

These results revealed that the aqueous bonding composition comprising the above-mentioned three components (A) to (C) is useful for bonding a wood-based element (raw material) and an excellent wood-based material can be molded by molding a wood-based element using the same.

The present invention can provide an aqueous bonding composition which is useful for bonding a wood-based element. A wood-based material can be suitably produced by molding a wood-based element using the aqueous bonding composition according to the present invention.

The invention claimed is:

1. A wood-based material coated with an aqueous bonding composition consisting of:
    (A) 20-95 parts by weight of a non-reducing disaccharide or a non-reducing trisaccharide;
    wherein the non-reducing disaccharide is selected from the group consisting of sucrose, lactose, maltose, trehalose, turanose, and cellobiose;
    and the non-reducing trisaccharide selected from the group consisting of raffinose, melezitose, and maltotriose;
    (B) 1-50 parts by weight of a phosphate, and
    (C) 0.5-50 parts by weight of at least one neutralizing agent selected from ammonia, 2-amino-2-methylpropanol, diethanolamine and/or N,N-dimethylaminoethanol, and
    one or more of a preservative, a mildew-proofing agent, a rust preventative, an organic thickener, and an inorganic thickener selected from clay and silica;
    based on 100 parts by weight of the total amount of the components (A) to (C),
    wherein the water-absorption thickness expansion coefficient (%) of the aqueous bonding composition is 12 or less, measured in accordance with JISA5908:2003.

2. The wood-based material of claim 1, wherein the aqueous bonding composition has a pH in a range of 7 to 9.

3. The wood-based material of claim 1, wherein the non-reducing disaccharide or trisaccharide is selected from the group consisting of sucrose, trehalose, and maltotriose.

4. The wood-based material of claim 1, wherein the aqueous bonding composition consists of (A) 60-85 parts by weight of the non-reducing disaccharide or trisaccharide; (B) 5-25 parts by weight of the phosphate; and (C) 2-25 parts by weight of the at least one neutralizing agent, and one or more of a preservative, a mildew-proofing agent, a rust preventative, an organic thickener, and an inorganic thickener selected from clay and silica.

* * * * *